United States Patent

Heywang

[15] 3,644,805
[45] Feb. 22, 1972

[54] REGENERATABLE ELECTRIC CONDENSER

[72] Inventor: Hermann Heywang, Munich, Germany

[73] Assignee: Siemens Aktiengesellschaft, Berlin and Munich, Germany

[22] Filed: July 17, 1970

[21] Appl. No.: 55,779

[30] Foreign Application Priority Data

July 28, 1970 Germany .................. P 19 38 319.8

[52] U.S. Cl. ............................................. 317/258, 317/260
[51] Int. Cl. ........................................ H01g 1/14, H01g 3/15
[58] Field of Search .................................. 317/258, 260

[56] References Cited

UNITED STATES PATENTS 3,215,909  11/1965  Schill ........................... 317/260 X
3,248,619  4/1966   Ferrante ........................ 317/260
3,303,550  2/1967   Banzhof ....................... 317/258 X

FOREIGN PATENTS OR APPLICATIONS 867,888  1/1953  Germany ........................ 317/258

Primary Examiner—E. A. Goldberg
Attorney—Hill, Sherman, Meroni, Gross & Simpson

[57] ABSTRACT

A regenerating condenser employs metal layers in a step-shaped cross section having thick and thin portions, the thin portions having low-heat capacity and the electrical conductivity of the thick to the thin portions being a preferred ratio of at least 1.5:1.

7 Claims, 2 Drawing Figures

INVENTOR
Hermann Heywang

BY
ATTYS.

REGENERATABLE ELECTRIC CONDENSER

BACKGROUND OF THE INVENTION

1. Field of the Invention

This invention relates to electrical condensers, and in particular to a regeneratable electrical condenser having condenser plates the thickness of which change in the current direction.

2. Description of the Prior Art

In a regeneratable electrical condenser the energy stored therein is sufficient to burn away the thin metal condenser plate in the case of a disruptive discharge in the area surrounding such a discharge. In order to obtain a perfect separation of the disruptive discharge area from the remaining metal coating, the metal condenser plate should possess a small heat capacity and conductivity. These desired characteristics are achieved in the vaporization of thin metal foils onto dielectric foils during condenser fabrication.

It is known from the teachings of German Pat. No. 887,541 to vary a condenser plate cross section in a wedgelike shape in the direction of current. Such a condenser regenerates and proves sufficient for most applications as well as condensers having plates of even thickness. For special applications, however, particularly in the area of high-performance capacitors for medium frequencies, the regeneratable thin metal coatings form series resistances which have the effect of a main heat source. The heat is lost as so-called loss efficiency and the application of such condensers is substantially narrowed.

SUMMARY OF THE INVENTION

The main object of the invention is to provide a regeneratable condenser having minimized losses.

According to the invention, the above object is fulfilled through the provision of condenser plates, the layer thickness of each of which is provided in steps of different thicknesses, and wherein the thicker portions of adjacent plates do not overlap.

The step- or stage-like metal layers are disposed relative to each other such that the thicker portions extend from approximately the center of the width of a condenser to its edges whereat frontal contacting techniques are employed for providing connections to the desired external circuitry. During formation, the thick metal portions are provided with as low a resistance as is possible with modern vaporizing apparatus and techniques, i.e., during the vaporizing process, so that much metal is evaporated with the best cooling methods; therefore, the dielectric or basis onto which the metal is applied does not suffer damage. The thin portion of each metal layer is provided so thinly that perfect self-healing is guaranteed upon the occurrence of a disruptive discharge. The thin and thick portions of different condenser plates lie opposite each other and are separated by a dielectric layer in the condenser.

BRIEF DESCRIPTION OF THE DRAWINGS

Other objects, features and advantages of the invention, its organization, construction and operation, will be best understood from the following detailed description of exemplary embodiments thereof, taken in conjunction with the accompanying drawings, in which.

DESCRIPTION OF THE PREFERRED EMBODIMENTS

Figure 1:
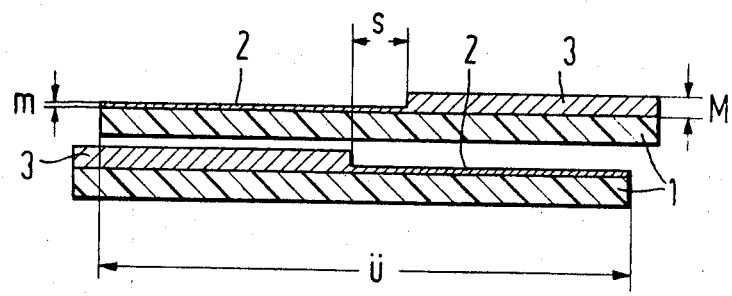
FIG. 1 illustrates, schematically and in cross section, a condenser construction according to the present invention in which dielectric foils are each metallized on one side.

In FIG. 1 a condenser is illustrated as comprising a pair of dielectric foils 1 each of which has thereon step-shaped metal layers, each of these layers including a thin portion 2 and a thick portion 3. The metal layers are carried on only one side of each of said dielectric foils 1. The metal portions 2 are sufficiently thin so as to guarantee regenerability of the condenser and the metal layer portions 3 are vaporized sufficiently thick through a controlled process which just prevents damage to the dielectric material during deposition.

The finished condenser is connected with outer connection elements at the frontal sides by means of frontal contact layers 6. These frontal contact layers embrace the marginal edges of the thick metal portions 3 which provides good electrical contact.

Figure 2:
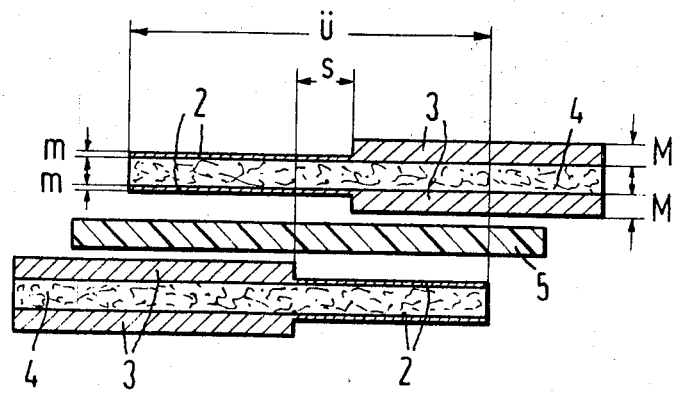
FIG. 2 illustrates, again schematically and in cross section, another condenser construction according to the present invention in which condenser plates are formed of insulating bands which are each metallized on both sides.

In FIG. 2 a condenser is illustrated as comprising a pair of bands of insulating material 4, each of the bands being metallized on both sides by step-shaped metal layers 2, 3 as in FIG. 1. The insulating material may be capable of impregnation and may advantageously consist of paper.

The thin metal portions 2 of each band support the regenerability of the condenser and are disposed opposite the thick portions 3 of the other band. The thin portions 2 of one band overlap the thick portions 3 of the other band and a dielectric layer 5 is disposed between the adjacent metal layers of the pair of bands.

The illustrations of FIGS. 1 and 2 are not drawn to size, but on an exaggerated scale. The following thickness relationships are provided for a more accurate picture of actual condenser sizes.

Dielectric thickness (1, 5)..............6
Thickness M (portions 3)...............0.1
Thickness m (portions 2)................0.05

The regenerability of a condenser according to this invention is almost practically determined by the thin metal portions 2. The stagelike thickened metal layer has a conductivity of about 0.4 through 1.5 S, which keeps the loss of the condenser as low as possible, and the thin portion has a conductivity of about 0.1 through 0.5 S. The ratio of the conductivities is selected to be at least 1.5:1. The loss in a condenser constructed in accordance with the teachings of the present invention is therefore essentially lower than in prior art regeneratable condenser plates. More specifically, if a current of the intensity 1 flows in a uniform coating with the regenerating thickness of $m$ and a specific resistance of $\rho$, and a plate overlap of $u$, which current exceeds the capacitively effective part as uniformly displaced current, the loss for 1 cm. of foil with may be expressed as $$N_1 = \frac{I^2 \delta \ddot{u}}{m} \int_0^1 x^2 dx = \frac{I^2 \delta \ddot{u}}{3m}.$$

If the plates would no longer regenerate, and have a thickness of M, which is substantially the maximum possible deposition on dielectric or paper, the loss would decrease and would be expressed as $$N_2 = \frac{I^2 \delta \ddot{u}}{M} \int x^2 dx = \frac{I^2 \delta \ddot{u}}{3M}.$$

As was mentioned hereinbefore, condensers are known which have a wedge-shaped plate profile, the thickness of which decrease in the range of the plate overlap. In such a construction, the strengthening cannot be based on the maximum metal layer thickness since such is the maximum strength (maximum vaporization). The value $m$ may not be exceeded in the center of the condenser since perfect regeneration cannot then be guaranteed. The loss magnitudes are therefore $$N_3 = I^2 \delta \ddot{u} \int_0^1 \frac{x^2 dx}{2(M-m)x + 2m - M}$$

$$= \frac{I^2 \delta \ddot{u}}{m} \cdot \frac{2\frac{M}{m} - 3 - \frac{\left(2 - \frac{M}{m}\right)^2}{2\left(\frac{M}{m} - 1\right)} \ln\left(\frac{2m}{M} - 1\right)}{4\left(\frac{M}{m} - 1\right)^2}$$

where $M \leq 2m$.

According to this invention the proposed construction provides a loss which lies between $N_1$ and $N_2$, and which may be expressed as $$N_4 = \frac{I^2\delta\ddot{u}}{m}\int_0^{1/2} x^2 dx + \frac{I^2\delta\ddot{u}}{M}\int_{1/2}^1 x^2 dx = I^2\delta\ddot{u}\left(\frac{1}{24m} + \frac{7}{24M}\right)$$

and if, for example, $M=2m$, the above losses may be compared as follows:

$N_1 = 0.333\ I^2\rho\ddot{u}/m$
$N_2 = 0.166\ I^2\rho\ddot{u}/m$
$N_3 = 0.250\ I^2\rho\ddot{u}/m$
$N_4 = 0.1875\ I^2\rho\ddot{u}/m$ From the above it thus becomes clear how near the loss of a condenser ($N_4$) according to the present invention approaches the loss of a nonregenerable condenser ($N_2$). As compared with prior art regenerating condensers, a reduction of the losses of about 45 percent is obtained. Even with optimum application of the metal profile according to the aforementioned German Letters Patent No. 887,541, a loss reduction of 25 percent is realized.

Advantageously, the thick portions 3 do not overlap, but are separated or offset by a safety margin of s which is measured in accordance with the process fluctuations of the manufacturing winding machine.

In addition to the above-mentioned advantages, heat dissipation is improved through the provision of frontal contacting.

Many changes and modifications may be made in the invention by one skilled in the art without departing from the true spirit and scope thereof, and it is to be understood that I wish to include within the patent warranted hereon all changes and modifications as may be reasonably and properly included within the scope of my contribution to the art.

I claim:

1. A regenerating electrical condenser comprising at least two parallel dielectric foils, at least two metal layers individually carried on said dielectric foils, each of said metal layers including a thick portion and a thin portion integrally joined therewith and defining a step-shaped cross section, said foils and metal layers disposed with the thick portion of one of said metal layers overlapping the thin portions of the other said metal layer.

2. A regenerating condenser according to claim 1, wherein each of said thick portions have a conductivity of a least 1.5 times that of the corresponding thin portion.

3. A regenerating condenser according to claim 1, comprising frontal contact layers connected to said thick portions.

4. A regenerating condenser according to claim 1, wherein the junction of a thick portion and a thin portion of one of said metal layers is spaced from the like junction of the other of said metal layers in the direction of the extent of said layers.

5. A regenerating condenser according to claim 1, wherein each of said thin portions have a low heat capacity and conductivity and is responsive to a disruptive current discharge to burn away and obtain separation of the disruptive discharge area from the remainder of the corresponding thick portion.

6. A regenerating electrical condenser comprising a first insulating layer, a second insulating layer, a first pair of metal layers carried on opposite sides of said first insulating layer, a second pair of metal layers carried on opposite sides of said second insulating layer, a dielectric layer disposed between said first and second insulating layers and in parallel thereto, each of said metal layers including a thick portion and a thin portion integrally joined therewith and defining a step-shaped cross section, said foils and metal layers disposed with the thick portion of one of said metal layers overlapping the thin portions of the other said metal layer, said thin portions carried on the same insulating layer disposed opposite one another, and said thin portions of said first pair of metal layers disposed opposite said thick portions of said second pair of metal layers.

7. A regenerating condenser according to claim 6, wherein said insulating layers include impregnable paper.

* * * * *